Feb. 22, 1955 R. J. NADHERNY 2,702,485
TENSIONING DEVICE
Filed July 27, 1951
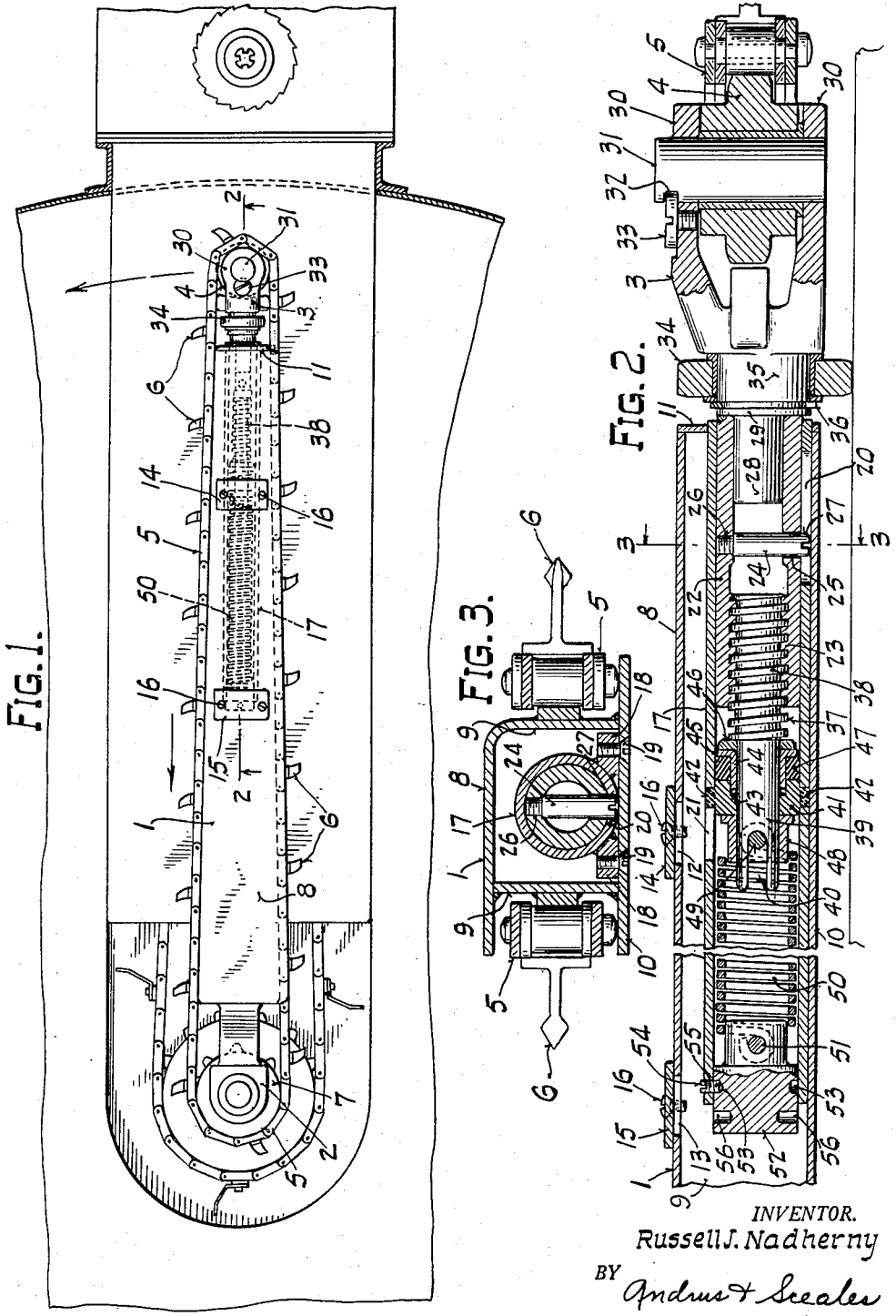
INVENTOR.
Russell J. Nadherny
BY
Andrus & Scealer
ATTORNEYS.

2,702,485

TENSIONING DEVICE

Russell J. Nadherny, Chicago, Ill., asssignor to A. O. Smith Corporation, Milwaukee, Wis., a corporation of New York Application July 27, 1951, Serial No. 238,963

11 Claims. (Cl. 74—242.14)

This invention relates to a tensioning device which is adapted to take up the slack, in for instance, an endless belt or chain, such as is found in certain types of conveyor systems.

The invention will hereinafter be described for use in connection with a cutter arm of an unloader unit disposed in the bottom of a silo and which is adapted to loosen silage stored within the silo so that the same may be removed therefrom by an endless conveyor. The cutter arm extends radially from the center of the silo floor to adjacent the inner surface of the surrounding silo shell and is provided with a pulley at the outer end over which a cutter bearing chain is disposed. The chain with its cutters is adapted to be driven around the arm, and the arm in turn is adapted to be turned slowly throughout the circumference of the silo to loosen the silage when it is engaged by the cutters as they advance progressively toward the outer end of the arm. For efficient operation of the cutters it is necessary that the means for supporting the cutters, in this instance a chain, be kept free of slack at all times and the device of this invention is adapted to accomplish this purpose.

One object of the invention is to provide a tensioning device for a chain or like drive which serves to maintain the chain in a taut condition during operation of the device.

A further object is to provide a device for the purpose above mentioned in which the chain may be readily tightened when need be, without disassembly of major parts of the apparatus.

Another object is to provide a tensioning device adapted to be disposed within a generally hollow housing and whereby the device is afforded substantial protection from extraneous matter from without the housing.

Another object is to provide a relatively simple tensioning device for an endless chain or the like, which is disposed within a housing, and in which any necessary adjustments to the device may be made through the top of the housing with a minimum of ease and within a relatively short period of time.

These and other objects of the invention will appear from the following description when taken in conjunction with the drawing in which:

Figure 1 is a top plan view of a cutter arm of a bottom unloader adapted for disposition adjacent the floor of a silo and having the tensioning device of the invention disposed within the cutter arm housing;

Fig. 2 is a longitudinal sectional view taken on line 2—2 of Fig. 1; and

Fig. 3 is a sectional view taken on line 3—3 of Fig. 2.

The unloading machine to which the invention has been applied has a cutter arm 1 which is secured to a hub 2 centrally disposed of the floor of the silo. A fork 3 is secured to the outer end of the arm and rotatably supports pulley 4. The chain 5 is provided with spaced cutters 6, which engage and dislodge silage stored within the silo. A drive sprocket 7 is disposed beneath the hub 2, and co-operates with pulley 4 to move the chain by a suitable motive source.

The arm 1 comprises a generally elongated hollow rectangular housing fabricated preferably from metal plates and has a top 8, side walls 9 and a bottom 10. The outer end of the housing is enclosed by a cover 11.

The top of the housing is provided with spaced openings 12 and 13 and cover plates 14 and 15 respectively to cover the openings. The openings provide access to the interior of the housing to manipulate the tensioning device disposed therein. The cover plates may be removably secured to the top of the housing member by any suitable means such as screws 16.

Support tube 17 is longitudinally disposed within the housing and is secured to support blocks 18 preferably by welding. The support blocks are removably secured to the inner surface of the bottom 10 of the housing by screws 19 extending upwardly through the bottom and into suitably threaded apertures spaced along the support blocks. The extreme outer end of the support tube extends through an opening in front cover 11. The support tube is thus rigidly but removably secured to the bottom of the housing.

The bottom of the outer end of the support tube is provided with a longitudinal keyway 20 while an opening 21, vertically aligned with opening 12, is disposed through the top of the tube. When cover plate 14 is removed access may be had through openings 12 and 21 to the interior of the support tube.

A hollow sleeve 22, provided at one end thereof with threads 23, is longitudinally disposed within the support tube 17 and is adapted for sliding movement therein. Pin 24, extending through an opening 25, in the bottom of the sleeve, is threaded at the upper end 26 into the top of the sleeve, while the bottom end 27 of the pin is disposed for sliding movement in the keyway 20.

Pulley fork 3 is provided with stub shaft 28, having a collar 29 disposed at one end thereof. The inner face of collar 29 is welded to the outer end of sleeve 22, as best seen in Fig. 2, so that the sleeve, fork and pulley may be moved longitudinally as a unit. Arms 30 of fork 3 are apertured to receive vertical shaft 31 about which the pulley 4 rotates. The upper end of shaft 31 is notched at 32 to receive a portion of the head of lock screw 33.

Wheel 34 is disposed for rotation on a bearing 35 at the rear of fork 3. An appropriate bushing and washer are associated with bearing 35 and wheel 34 and snap ring 36 is disposed between the washer and collar 29 to retain wheel 34 in place on the bearing. Wheel 34 serves to support the outer end of the cutter arm 1 as it rotates within the silo to loosen and dislodge the bottom layer of silage stored therein.

A spindle 37 threaded at one end 38 and having a plain portion 39 at the opposite end thereof is disposed longitudinally with its threaded end meshing with threads 23 of sleeve 22. The inner end of spindle 37 is bifurcated at 40.

Spindle 37 is journaled in member 41 which is disposed within support tube 17 and secured thereto as by welds 42. One side of member 41 is recessed at 43 to receive an end of bushing 44 the opposite end of the bushing being provided with a flange 45. Washer 46 is disposed over member 39 and between one side of collar 46 and the inner threaded end 38 of spindle 37. A rubber washer or cushion 47 is disposed over the bushing 44 and between the outer surface of abutment 41 and the inner face of flange 45. The plain end portion 39 of spindle 37 is thus disposed for longitudinal sliding movement within fixed abutment 41, bushing 44 and washer 46.

A sleeve 48 is disposed over the bifurcated end 40 of spindle 37 and has a flanged end which bears on the inner face of the fixed abutment 41. Sleeve 48 has opposed holes therein to receive pin 49 to anchor the inner looped end of longitudinally disposed torsion spring 50 adjacent the bottom of the bifurcated end 40 of the spindle 37. The opposite end of the spring is also looped and secured by pin 51 to the reduced end of plug 52 which is disposed within the inner end of spring 50. The mid portion of the body of plug 52 is provided with a plurality of radially spaced holes 53, the upper one of which receives the end of set screw 54 disposed in a threaded aperture 55 of sleeve 17.

A plurality of spaced sockets 56 in the plug 52 are adapted to receive a tool inserted through opening 13 in the top 8 of the housing. When set screw 54 has been removed, the end of a suitable tool inserted through opening 13 and into openings 56, will permit turning of the plug to any desired position.

In the event that too much slack occurs in the chain 5 which carries the cutters 6 the slack may be taken up in the following manner. With set screw 54 removed and a proper tool disposed in a socket at the inner end of plug 52, turning of the plug by the tool will tighten or wind up the torsion spring 50. As the spring is tightened spindle 37 rotates and by its screw connection moves sleeve 22 longitudinally outward away from sprocket 7 thereby taking up any slack which might exist in the chain. When sufficient tautness has been attained in the chain set screw 54 is disposed in one of the spaced holes 53 of the adjustment plug. At the same time, the spring 50 having been wound up or put under tension, the chain will retain the desired tautness.

The invention provides a chain tightening device which automatically prevents development of slack in the chain of a conveyor and thereby effectively improves the overall efficiency of the device in operation. The tensioning of the chain is particularly important in an unloader for silage or the like where the chain is subjected to different conditions of stress depending upon the condition of the material in which the chain is operating.

Various embodiments of the invention may be employed within the scope of the accompanying claims.

I claim:

1. A tensioning device for a driven member rotatably driven around a support member, which comprises a threaded member longitudinally disposed within said support for sliding movement therein with the outer end of the threaded member in engagement with said driven member, a second threaded member rotatably disposed in said support and threaded into engagement with said first named threaded member, and torsional means to urge said second threaded member rotatably in a direction to force said first threaded member outwardly for maintaining the driven member taut during operation.

2. A tensioning device for the chain of a generally elongated cutter arm driven around the bottom of a storage container for dislodging stored material, said chain extending around the arm and being rotatably driven, which comprises a guide means secured longitudinally within said arm, a threaded member longitudinally disposed within the guide means for sliding movement therein with the outer end of said member in engagement with said chain, a second threaded member rotatably disposed in said guide means and threaded into engagement with said first named threaded member, and pre-loaded torsional means to urge said second threaded member rotatably in a direction to force said first threaded member outwardly for maintaining the chain taut during operation.

3. A tensioning device for a chain rotatably disposed on a cutter arm of a generally elongated rectangular shape for dislodging stored material within the bottom of a container, which comprises a tubular support disposed longitudinally of and within said arm, a threaded member longitudinally disposed within said support in engagement with said chain and adapted for sliding movement with respect thereto, a second threaded member threadedly engaged with said first named threaded member, and pre-loaded torsional means to urge said second threaded member in a direction to force said first threaded member outwardly with respect to the support to distend the chain.

4. A tensioning device for a chain rotatably disposed on a cutter arm of a generally elongated rectangular shape for dislodging stored material within the bottom of a container, which comprises a tubular support disposed longitudinally of and within said arm, a threaded member longitudinally disposed within said support in engagement with said chain and adapted for sliding movement with respect thereto, a second threaded member threadedly engaged with said first named threaded member, a torsion spring removably secured at one end to said second named threaded member, and means disposed within said support at the opposite end of said spring to pre-load the spring a predetermined number of turns and thereby urge said second threaded member in a direction to force said first threaded member outwardly for maintaining the chain taut during operation.

5. A tensioning device for a chain rotatably disposed on a cutter arm of a generally elongated rectangular shape for dislodging stored material within the bottom of a container, which comprises a tubular support disposed longitudinally of and within said arm, a threaded member longitudinally disposed within said support in engagement with said chain and adapted for sliding movement with respect thereto, a second threaded member threadedly engaged with said first named threaded member, an abutment secured to said tubular support and disposed over one end of said second named threaded member, means disposed within and at one end of said support and adapted for rotation with respect thereto, a torsion spring longitudinally disposed between said second named threaded member and said means whereby rotation of said means permits pre-loading of said spring a predetermined number of turns and thereafter sliding movement of the first named threaded member to provide tautness in the chain.

6. A tensioning device for a chain rotatably disposed on a cutter arm of a generally elongated rectangular shape for dislodging stored material within the bottom of a container, which comprises a tubular support disposed longitudinally of and within said arm, a threaded member longitudinally disposed within said support in engagement with said chain and adapted for sliding movement with respect thereto, a second threaded member threadedly engaged with said first named threaded member, and having a bifurcated end portion, a plug adapted for rotation and disposed at one end of the tubular support, and a torsion spring disposed between the plug and the bifurcated end portion of said second named threaded member and being keyed to each other respectively whereby rotative movement of the spring in a selected direction will effect rotative movement of said second named threaded member to impart tightness to said chain in the cutter arm.

7. In a chain driven cutter arm for dislodging stored silage within the bottom of a storage structure a tensioning device disposed longitudinally within a cutter arm housing comprising a generally tubular support secured to said housing and provided with a keyway at one end thereof, an internally threaded sleeve disposed within said support and being keyed thereto for sliding movement with respect to the support, a screw having one end thereof disposed within and threadedly engaged with the sleeve, the opposite end of said screw being disposed outside the sleeve and having a bifurcated end portion to receive one end of a longitudinally disposed torsion spring, a plug disposed within the support and adapted to receive the opposite end of said spring, and radially spaced openings in said plug to receive a tool to rotate the plug to thereby move the sleeve longitudinally of the support.

8. Automatic slack take-up mechanism comprising guide means, a slide disposed for linear movement in said guide means, a member fixedly positioned relative to said guide means, a first threaded element fixed to said slide with its axis parallel to the movement thereof, a second threaded element in rotary abutment with said member and in threaded engagement with said first threaded element, and spring actuated means exerting a constant rotary force on said second threaded element to produce linear movement of said slide.

9. Mechanism as defined in claim 8, including an idler wheel rotatably carried by said slide.

10. Mechanism as defined in claim 8, including means for connecting said slide to a flexible power transmission element.

11. Automatic slack take-up mechanism comprising guide means, a slide member disposed for movement in said guide means, an abutment member fixedly positioned relative to said guide means, a first threaded element fixed to one of said members with its threaded axis parallel to the movement of said slide member, a second threaded element rotatably abutting against the other of said members and in threaded engagement with said first threaded element, and spring actuated means exerting a constant rotary force on said second threaded element.

References Cited in the file of this patent

UNITED STATES PATENTS

| 2,068,070 | Pray | Jan. 19, 1937 |
| 2,625,829 | Nolt | Jan. 20, 1953 |

FOREIGN PATENTS

| 791,664 | France | Sept. 30, 1935 |